US011134310B1

(12) United States Patent
Argenti

(10) Patent No.: US 11,134,310 B1
(45) Date of Patent: Sep. 28, 2021

(54) CUSTOM CONTENT SERVICE

(71) Applicant: Amazon Technologies, Inc., Seattle, WA (US)

(72) Inventor: Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/455,607

(22) Filed: Jun. 27, 2019

(51) Int. Cl.
*H04N 21/45* (2011.01)
*H04N 21/466* (2011.01)
*H04N 21/458* (2011.01)

(52) U.S. Cl.
CPC ....... *H04N 21/4532* (2013.01); *H04N 21/458* (2013.01); *H04N 21/4667* (2013.01)

(58) Field of Classification Search
None
See application file for complete search history.

(56) References Cited

U.S. PATENT DOCUMENTS

| | | | | | |
|---|---|---|---|---|---|
| 6,128,712 | A * | 10/2000 | Hunt | ................... | G11B 27/105 348/E7.061 |
| 7,283,045 | B1 * | 10/2007 | Manz | ................. | G08B 21/0269 340/506 |
| 8,620,770 | B1 * | 12/2013 | Pope | .................. | G06Q 30/0201 705/26.7 |
| 8,781,716 | B1 * | 7/2014 | Wenneman | .......... | G08G 1/0129 701/118 |
| 8,982,670 | B1 * | 3/2015 | Pappafotis | .............. | F41H 11/16 367/124 |
| 9,179,258 | B1 * | 11/2015 | Siegel | .................... | H04W 4/029 |
| 9,406,091 | B1 * | 8/2016 | Lopez | .................... | G06Q 50/01 |
| 9,516,470 | B1 * | 12/2016 | Scofield | ................ | H04W 4/029 |
| 9,579,060 | B1 * | 2/2017 | Lisy | ...................... | A42B 3/0453 |
| 2002/0053089 | A1 * | 5/2002 | Massey | .............. | H04N 21/4135 725/135 |
| 2003/0046638 | A1 * | 3/2003 | Thompson | ........... | G11B 27/105 709/231 |
| 2005/0020223 | A1 * | 1/2005 | Ellis | ................... | H04M 1/72522 455/186.1 |
| 2008/0122695 | A1 * | 5/2008 | Wang | .................... | G01S 5/0252 342/451 |
| 2011/0107215 | A1 * | 5/2011 | Klappert | ............ | H04N 21/4622 715/716 |
| 2012/0284333 | A1 * | 11/2012 | Neff | ........................ | G06F 16/29 709/204 |
| 2013/0024508 | A1 * | 1/2013 | Sathish | ............ | H04N 21/44227 709/204 |
| 2013/0195427 | A1 * | 8/2013 | Sathish | .............. | H04N 21/4508 386/248 |

(Continued)

*Primary Examiner* — William J Kim
(74) *Attorney, Agent, or Firm* — Robert C. Kowert; Kowert, Hood, Munyon, Rankin & Goetzel, P.C.

(57) ABSTRACT

A custom content service provides customized content to a client who has opted-in to share limited location information with the customized content service. For example, the custom content service may customize content streamed to the client, such as videos, video games, audio, etc. based on experiences the client has had during the day. The custom content service may customize content for the client without requiring the client to directly make content selections and without interrupting viewing of content to ask the client to provide inputs for content selection decisions.

20 Claims, 11 Drawing Sheets

(56) References Cited

U.S. PATENT DOCUMENTS

| | | | |
|---|---|---|---|
| 2013/0268620 A1* | 10/2013 | Osmíner | H04N 21/251 709/217 |
| 2014/0136186 A1* | 5/2014 | Adami | H04N 21/47217 704/9 |
| 2015/0294685 A1* | 10/2015 | Bloch | G11B 27/034 386/278 |
| 2016/0295248 A1* | 10/2016 | Carney Landow | H04N 21/4532 |
| 2016/0322054 A1* | 11/2016 | Bloch | H04N 21/4825 |
| 2017/0245023 A1* | 8/2017 | Brelis | H04N 21/482 |
| 2018/0008894 A1* | 1/2018 | Sack | G06Q 50/10 |
| 2019/0098371 A1* | 3/2019 | Keesan | H04N 21/25883 |
| 2020/0037048 A1* | 1/2020 | Cheung | H04N 21/8545 |

\* cited by examiner

CUSTOM CONTENT SERVICE

BACKGROUND

Most videos produced today, whether live action videos, animated videos, or other types of videos, include a pre-defined storyline and a pre-defined ending. For example, a typical movie or cartoon comprises pre-produced content that is fixed at the time of production from beginning to end. Some videos currently produced may allow viewers to select between different pre-recorded versions, such as a version with director's comments dubbed over movie content, special features content associated with a movie, etc. However, such pre-recorded versions are also fixed at the time of production from beginning to end.

Other media content may ask a viewer to make a selection as to how to proceed with viewing the content. However, in such cases, the viewer is interrupted during the viewing of the content to provide input to select a next content segment at decision points along the storyline. Such interruptions, may diminish the viewing experience and distract a viewer.

Figure 1:
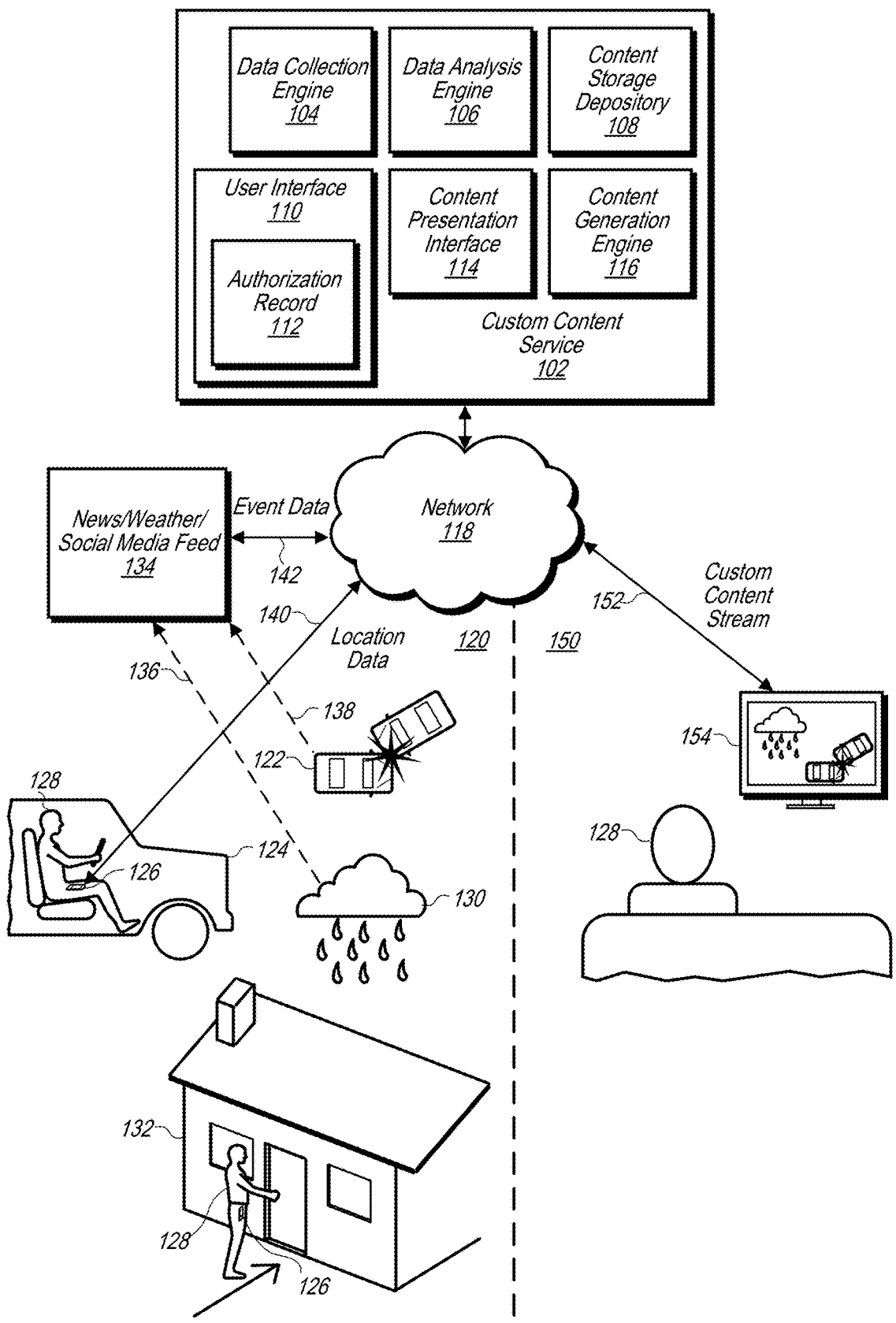
FIG. 1 is a high-level illustration of a custom content service along with client devices interacting with the custom content service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for determining, generating, and presenting custom content without requiring direct user input are disclosed.

According to some embodiments, a system for implementing a custom content service includes one or more computing devices, wherein the one or more computing devices store program instructions, that when executed, on or across one or more processors, cause the one or more processors to implement a data collection engine, a data analysis engine, and a content presentation interface. In some embodiments, the program instructions, when executed on or across the one or more processors, further cause the one or more processors to implement a user interface for receiving authorization to participate in the custom content service and a content generation engine to generate content to be displayed via the content presentation interface.

The data collection engine is configured to receive authorization from a client of the custom content service indicating that that the client has selected to participate in data collection for use in providing custom content to the client. For example, the data collection engine may receive authorization submitted via a user interface of the custom content service. In response to receiving the authorization, the data collection engine is configured to collect information related to locations the client has visited from a mobile device of the client and collect information from one or more additional information sources, wherein the information collected from the one or more additional information sources comprises location information.

Additionally, the data analysis engine is configured to determine one or more event tags associated with one or more of the locations the client has visited or one or more routes the client has taken, wherein to determine the one or more event tags, the data analysis engine is configured to associate event information from the mobile device or event information from the one or more additional information sources with locations the client has visited or a route the client has taken. Also, the data analysis engine is configured to determine one or more content selection decisions based on a set of event tags determined for a set of locations or routes the client has visited or taken during a time period prior to making the one or more content selection decisions. Moreover, the content presentation interface is configured to present customized content to the client comprising content selected based, at least in part, on the determined one or more content selection decisions, wherein the system is configured to customize the content presented to the client based on the locations the client has visited or the routes the client has taken and events associated with the locations the client has visited or routes the client has taken, without directly asking the client to provide input to make the one or more content selection decisions. In some embodiments, a content generation engine may generate the customized content based on content selection decisions received from the data analysis engine and provide the generated content to the content presentation interface for presentment to the client of the custom content service.

According to some embodiments, a method of providing custom content includes collecting information related to locations a client of a custom content service has visited from a mobile device of the client or from the one or more additional information sources and determining one or more tags associated with one or more of the locations the client has visited. The method additionally includes determining one or more content selection decisions based on a set of tags determined for a set of locations the client has visited and presenting customized content to the client comprising content selected based, at least in part, on the determined one or more content selection decisions.

According to some embodiments, one or more non-transitory computer-readable storage media store program instructions, that when executed on or across one or more processors, cause the one or more processors to collect information from a mobile device of a client of a custom content service or from one or more additional information sources, wherein the information is related to locations the client of the custom content service has visited and determine, based on the collected information, one or more tags associated with one or more of the locations the client has visited. The program instructions, when executed on or across the one or more processors, further cause the one or more processors to determine one or more content selection decisions based on a set of tags determined for a set of locations the client has visited and cause customized content to be presented to the client, wherein the customized content comprises content selected based, at least in part, on the determined one or more content selection decisions.

Most videos comprise pre-recorded content from beginning to end. Some media content may allow for customization, such as asking a viewer to select between multiple endings. However, the process of asking for input to select a next content segment and waiting on the viewer to provide a selection may interrupt the viewing experience for the user, may distract the viewer, or may otherwise diminish the viewing experience for the viewer of the content. However, in some embodiments, a custom content service may provide customized video content to a viewer without interrupting the viewing of the content to seek input and without waiting for responses from the viewer.

For example, in some embodiments, a custom content service may passively collect input related to a viewer without directly asking the viewer for content selection input and without interrupting the viewing experience of the viewer to request and receive input for use in making a content selection decision. Such an approach may provide a smoother and less distracting viewing experience to the viewer than other systems that ask the viewer to provide input in order to make content selection decisions. For example, in some embodiments, a custom content service may present a user/viewer of the custom content service with an option to allow a limited amount of information about events that have taken place during the day for the user/viewer to be shared with the custom content service for use in selecting content for the user/viewer. For example, the user/viewer (e.g. client of the custom content service) may opt-in to sharing limited location information from a mobile device carried by the user. The limited location information may indicate places the client has visited or routes the client has taken. In some embodiments, the custom content service may additionally collect publicly available information about the places the client has visited or routes the client has taken, such as from news reports, traffic reports, weather reports, social media feeds, event listings, etc. The custom content service may associate events with locations the client has visited or passed during the day and may further use this set of events that the client has encountered during the day in order to customize content for the client to view.

For example, a client of a custom content service (also referred to herein as a "user" or "viewer") may opt into sharing location information related to the client's drive home. For example, by selecting a geographic area within which location information is to be shared and/or by selecting a time period within which location information is to be shared with the custom content service (e.g. from 5:00 p.m. to 6:00 p.m. and in a geographic area between the client's office and house). Continuing the example, the client may encounter a strong thunderstorm and pass a vehicle collision on the way home from the office. The custom content service may determine based on a weather feed that locations through which the client passed between the client's office and home were affected by a strong thunderstorm. The custom content service may further determine based on a news feed or a social media feed that a vehicle collision occurred on a route taken by the client between the client's office and home. The custom content service may accordingly select customized media content for the client to view based on the knowledge that the client recently drove through a strong thunderstorm and by a vehicle collision.

For example, in some embodiments, the custom content service may select a story ending for a streaming show that includes a car wreck, or may customized pre-recorded content to include a thunderstorm background. Thus, the client may have customized media content presented to the client that relates to recent experiences of the client. Conversely, in some embodiments, the custom content service may select a story ending that avoids one or more events that are undesirable such as avoiding a car wreck or having bright sunny weather, rather than the thunderstorm, based on the knowledge that the client recently drove through a strong thunderstorm to get home and passed a car-wreck on the route home. In this way, the custom content service may customize the customized media content to compensate for experiences the client has recently experienced.

In some embodiments, a custom content service may utilize a client's life events to customize content to be presented to the client, wherein the life events are inferred (without directly asking the client) based on location information for places the client has visited or routes the client has taken. In some embodiments, the custom content service may further utilize application programmatic interfaces (APIs) to public weather or news services, events described in social media feeds as taking place at or near locations the client has visited or routes the client has taken, or events publicized, for example via internet advertisements, as taking place at or near locations or routes the client has visited/taken. The customized content service may utilize the location information and additional information related to locations near places the client has visited or routes the client has taken in order to make content selection decisions for customized media content to be presented to the client. In some embodiments, the custom content service may utilize such content selection decisions to select between multiple content segments, or to custom generate content segments. For example, a custom content service may select between pre-recorded content segments, generate customized content segments, for example via computer graphics rendering, or customize pre-recorded content segments with custom generated content (e.g. computer graphics).

In some embodiments, the customized content may include videos such as movies, television shows, video clips, etc. In some embodiments, the customized content may include audio such as music playlists, a meditation soundtrack that is adjusted based on life events, or other types of audio. In some embodiments, the customized content may include video games, wherein terrain, objects in the game, etc. are adjusted based on life events of the client. Also, in some embodiments, performance of a character in a video game may be tied to real-life activities of a client. For example, a strength of a character in a video game may be adjusted by a custom content service based on activities performed by the client in the real-world. As an example, a strength of a character assigned to the client in a video game may increase if the client exercises in the real-world and may decrease if the client skips an exercise training session, as an example. In some embodiments, the customized content may include augmented reality or virtual reality content that is customized based on life experiences of a client. For example, a client that experiences shorter daylight hours in the real-world may be presented with additional sunlight scenes in a virtual world or augmented reality world, as an example.

FIG. 1 is a high-level illustration of a custom content service along with client devices interacting with the custom content service, according to some embodiments.

In some embodiments, a custom content service is implemented on one or more computing devices and includes a data collection engine, a data analysis engine, a content storage depository, a content generation engine, a content presentation interface, and a user interface that stores client authorization records. For example, custom content service 102 includes data collection engine 104, data analysis engine 106, content storage depository 108, user interface 110 that receives authorization records 112, content presentation interface 114, and content generation engine 116. The authorization records 112 may be stored in an authorization record repository (not depicted).

Figure 7:
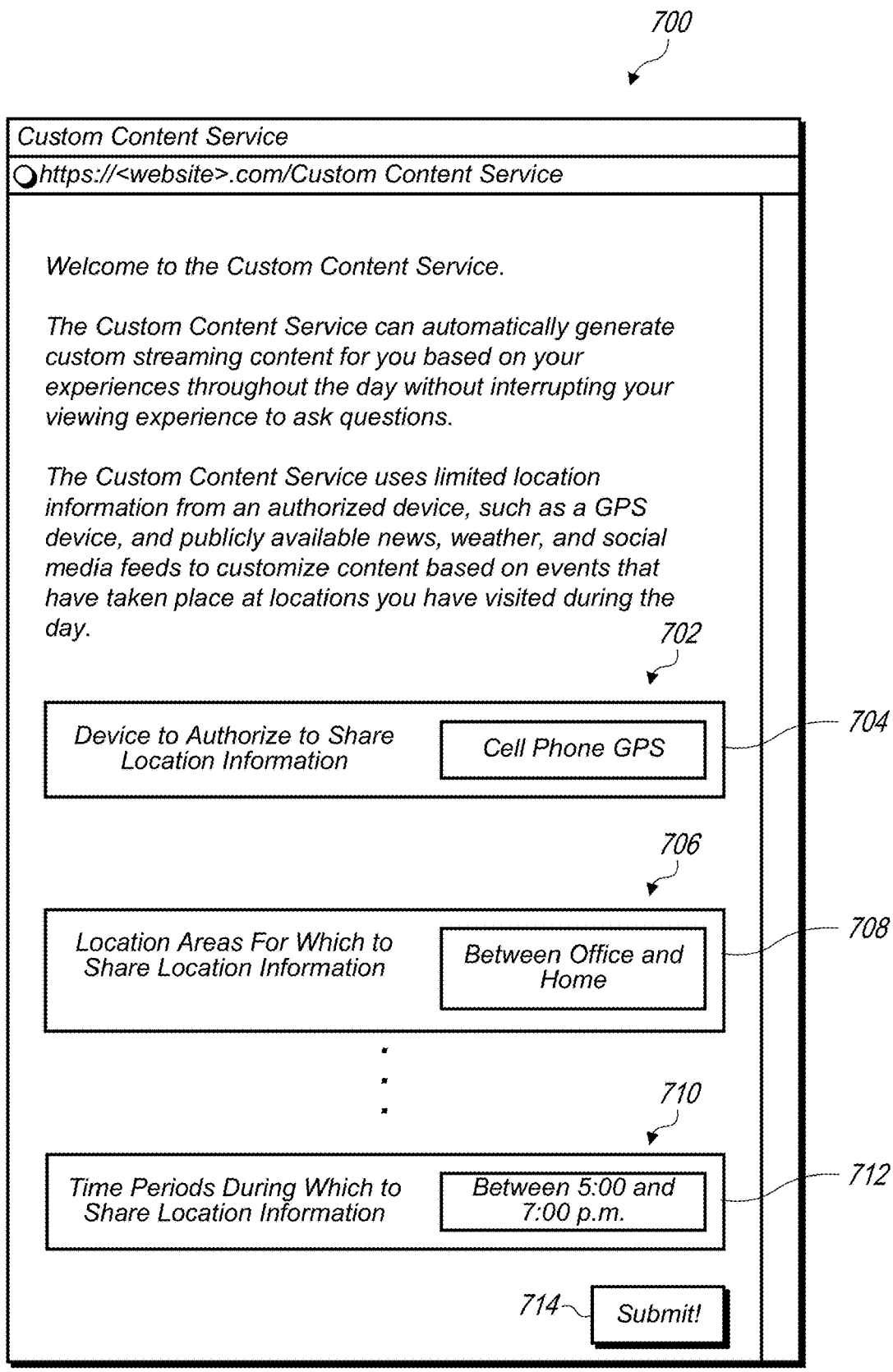
FIG. 7 illustrates an example user interface for opting into a custom content service, according to some embodiments.

In come embodiments, a client of a custom content service, such as client 128 of custom content service 102, may opt-in to limited information sharing in order to allow the custom content service to customize content for the client without interrupting the client to ask for content selection input. For example, FIG. 7 illustrates an example webpage thru which a client may opt-in to sharing limited location information about the client for use in determining customized content for the client. In some embodiments, a user interface of a custom content service, such as user interface 110 of custom content service 102, may implement such a webpage or may implement an application programmatic interface, command line interface, or other type of interface that allows a client to opt-in to data collection for a custom content service.

In some embodiments, a user interface, such as user interface 100, or another storage associated with a custom content service, may store authorization records indicating clients that have opted-in to sharing location information with a custom content service, such as authorization records 112. In some embodiments, authorization records, such as authorization records 112, may further include client defined limitations on when and where location information may be shared with the custom content service. For example, a client may specify that the client only desires to share location information during set time periods of the day and/or within particular geographic regions. As an example, a client may opt-in to share location information related to the client's drive home, such that the client restricts the sharing of information to take place during a time window when the client normally drives home from work and/or restricts the sharing of information to occur within a geographic region between the client's office and the client's home. In this way, a custom content service may collect sufficient location information from the client in order to provide customized content to the client, but may also limit the amount of information collected based on the client's preferences.

For example, client 128 has opted-in to allow location data 140 from mobile device 126 of client 128 to be shared with custom content service 102. As an example, mobile device 126 may share location information about places client 128 has visited or routes client 128 has taken on the way home from the office. As a particular example, in environment 120 client 128 may drive vehicle 124 by vehicle collision 122 on the way home and may experience rainstorm 130 when entering house 132 from vehicle 124. In some embodiments, a news/weather/social media feed 134 may collect information about events and locations of events and share the event data with a custom content service. For example, a weather feed of news/weather/social media feed 134 may share weather information 136 about rainstorm 130 at locations that include house 132. Furthermore, a news feed or social media feed of news/weather/social media feed 134 may share vehicle collision/traffic information 138. The event data (e.g. weather information 136 and vehicle collision/traffic information 138) may be shared with custom content service 102 as event data 142 shared over network 118. In some embodiments, location information from mobile device 126 may be shared with custom content service 102 via network 118 or via a separate network, such as a cellular network.

In some embodiments, event data 142 and location data 140 are collected by data collection engine 104 and provided to data analysis engine 106. As described in more detail in FIGS. 4-6, a data analysis engine, such as data analysis engine 106, may determine event tags based on data signatures of the collected event data 142 and location data 140. Furthermore, a data analysis engine, such as data analysis engine 106, may utilize one or more content selection decision frameworks to make content selection decisions based on the event tags and locations of the event tags, wherein the event tags correspond with locations the client has visited and/or routes the client has taken.

In some instances, a user may not wish to authorize the collection of data via the user's mobile device. In such instances, the user can provide, via a user interface of the data collection engine, various location information, such as the route the user took to work, the user's work location, home location, or any other location information the user wishes to share. The user can also choose to share times corresponding with each of the locations the user shares to aid in more accurately determining the events that the user may have experienced during the day. This information can be utilized in a similar manner to the location information collected automatically via the user's mobile device to provide customized content for the user.

In some embodiments, a content generation engine, such as content generation engine 116, may generate custom content or may adapt pre-recorded content based on one or more content selection decisions made by a data analysis engine, such as data analysis engine 106. For example, content generation engine 116 may render computer graphics or may include computer graphics in pre-recorded content, such as content recorded in front of a blue-screen or green-screen, wherein a background of the content is filled-in with computer generated graphics. Also, in some embodiments, a data analysis engine may make a content selection decision to select a particular pre-recorded content segment without requiring content generation engine 116 to generate computer graphics. In either circumstance, the custom selected content or the custom generated content may be provided to content presentation interface 114, wherein the content presentation interface 114 prepares the customized content to be provided to a client, such as client 128, for example via a streaming service. For example, at viewing location 150, client 128 may be receive streaming custom content 152 for viewing on home device 154, wherein the streaming custom content 152 includes customized content based on the client 128's recent life experiences, e.g. car collision 122 and rainstorm 130.

In some embodiments, the customized content may be selected from pre-defined choices or custom generated choices using the event data 142 and location data 140 and a maximum likelihood framework to select custom content from the pre-defined choices that are most likely to align with life experiences recently experienced by the client. In some embodiments, pre-recorded content or templates for generating computer generated content may be stored in content storage depository 108 and may support multiple endings, multiple threads in a storyline, etc.

Figure 2:
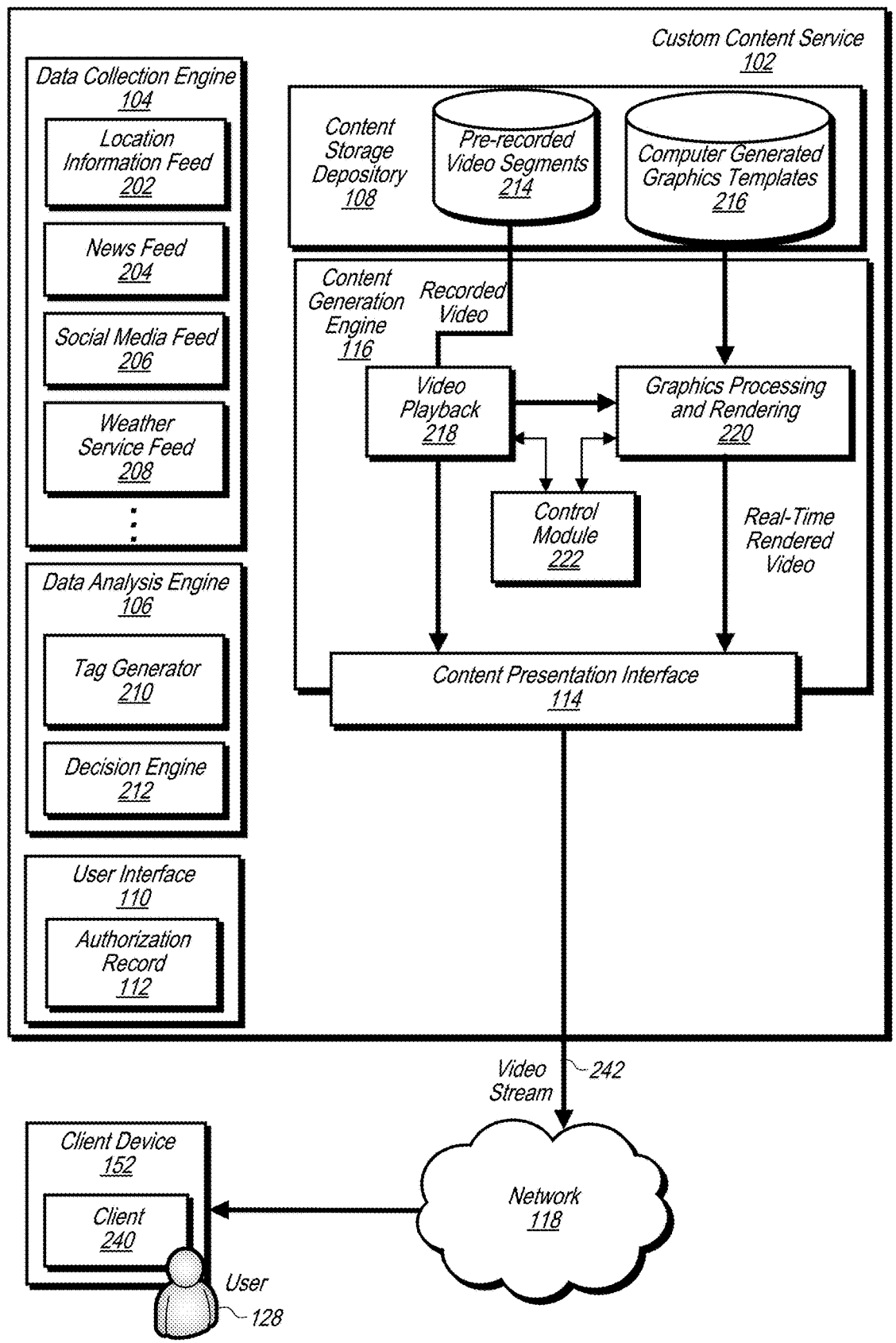
FIG. 2 is a more detailed illustration of a custom content service, according to some embodiments.

FIG. 2 is a more detailed illustration of a custom content service, according to some embodiments.

In some embodiments, a data collection engine, such as data collection engine 104, includes interfaces, such as APIs, to a location information feed 202, news feed 204, social media feed 206, weather service feed 208, and/or additional feeds. In some embodiments, a location information feed 202 may be from an application downloaded to a client device such as client 128's mobile device 126. In some embodiments, the client may define when and where location information is to be shared with a custom content service and these settings may be used to configure the application on the client device. In some embodiments, the location information may further include speed of travel information. In some embodiments, an application executing on a client device such as client 128's mobile device 126 may share location information with a custom content service via a cellular network connection to an API to the custom content service, such as a location information feed API.

Figure 5:
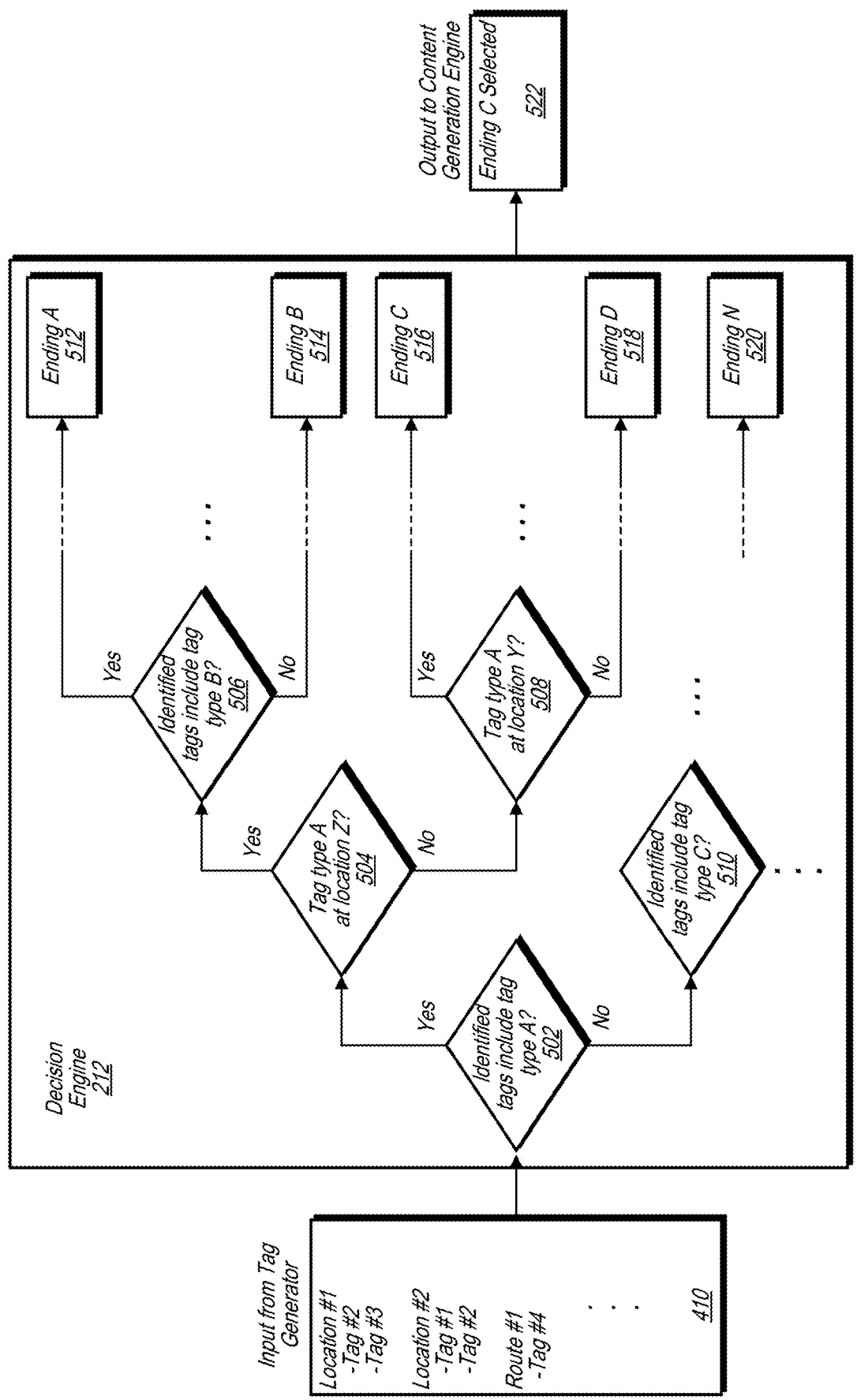
FIG. 5 is a more detailed illustration of a decision engine of a custom content service that utilizes a decision tree process, according to some embodiments.
Figure 6:
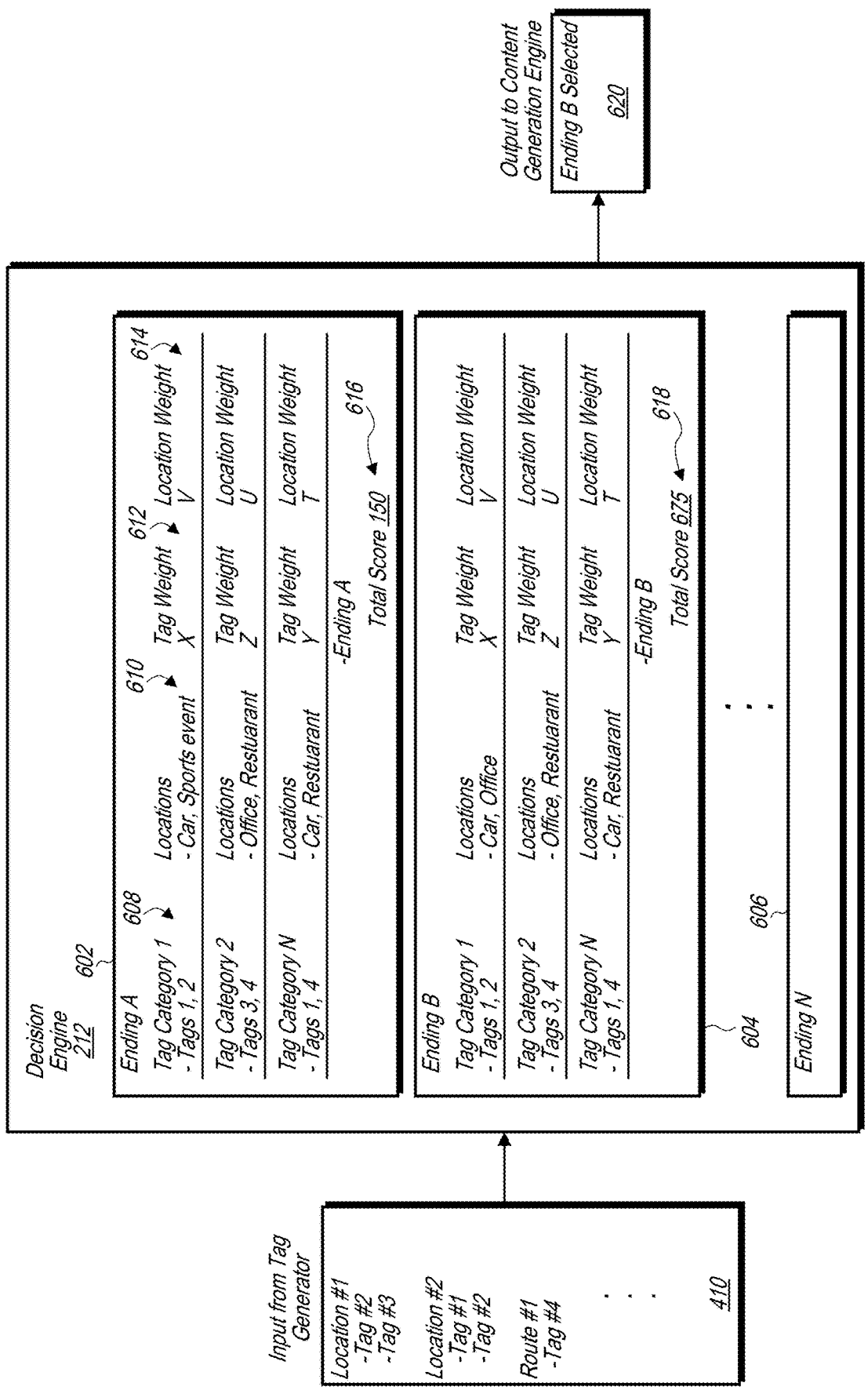
FIG. 6 is a more detailed illustration of a decision engine of a custom content service that utilizes a scoring process, according to some embodiments.

In some embodiments, a data analysis engine, such as data analysis engine 106, may include a tag generator 210 and a decision engine 212. In some embodiments, a tag generator, such as tag generator 210, may parse incoming information feeds from data collection engine 104 to identify data signatures that correspond with known tags, such as event tags or key words. The tag generator may then output tags associated with locations the client has visited or routes the client has taken. In some embodiments, a decision engine, such as decision engine 212, may use tags determined by tag generator 210 as an input and may apply the tags to a decision hierarchy such as a decision tree or point scoring decision analysis hierarchy in order to make one or more content selection decisions. For example, FIG. 5 illustrates an example of a decision tree process and FIG. 6 illustrates an example of a point scoring decision analysis hierarchy, according to some embodiments.

In some embodiments, a content storage depository, such as content storage depository 108, may store pre-recorded video segments, such as pre-recorded video segments 214, and computer generated graphics templates, such as computer generated graphics templates 216.

In some embodiments, a content generation engine, such as content generation engine 116, may generate customized content based on content selection decisions made by decision engine 212 of data analysis engine 106. For example, decision engine 212 may select a particular one of a plurality of pre-recorded video segments 214 to be used to provide custom video content to client application 240 on client device 152. Additionally, or alternatively, a custom content generation engine, such as content generation engine 116, may generate computer graphics based on content selection decisions made by decision engine 212 of data analysis engine 106. In some embodiments, the computer graphics may supplement the particular selected pre-recorded video segment, or may be used in place of pre-recorded video segments. In some embodiments, a content generation engine, such as content generation engine 116, may include a control module 222 that controls video playback 218 and graphics processing and rendering 220 in order to generate customized content in accordance with content selection decisions made by decision engine 212 of data analysis engine 106. In some embodiments, the customized content may be rendered in real-time and provided to a content presentation interface, such as content presentation interface 114. The content presentation interface may provide the customized content to a client application, such as client application 240, executing on client device 152. In some embodiments, the customized content may be provided as a video stream 242 via network 118.

In some embodiments, client device 152 and mobile device 126 may be the same device or different devices. For example, in some embodiments the client may view the customized content on the same mobile device that provides the location information, or may view the customized content on a different device that receives streaming customized content from the custom content service, such as a home television, computer, etc.

In some embodiments large amounts of 2D or 3D graphics data may be used in generating and rendering scenes for customized content (e.g., for movies). Note that this graphics data may be used in 2D or 3D rendering of video content according to different production techniques, for example in producing fully rendered, animated video content according to computer graphics techniques as well as in producing partially rendered video content that involves filming live action using green- or blue-screen technology and filling in the background and/or adding other content or effects using one or more computer graphics techniques. For a given scene, this graphics data may include, but is not limited to, 2D or 3D object model data such as object frames or shapes (e.g., wire frames), wraps for the frames, surface textures and patterns, colors, animation models, and so on, that is used to generate models of objects for the scene; general scene information such as surfaces, vanishing points, textures, colors, lighting sources, and so on; information for global operations or effects in the scenes such as illumination, reflection, shadows, and simulated effects such as rain, fire, smoke, dust, and fog; and in general any information or data that may be used in generating a modeled world for the scene and in rendering 2D representations of the world (e.g., video frames) as video output.

Example Provider Network Environment

Figure 3:
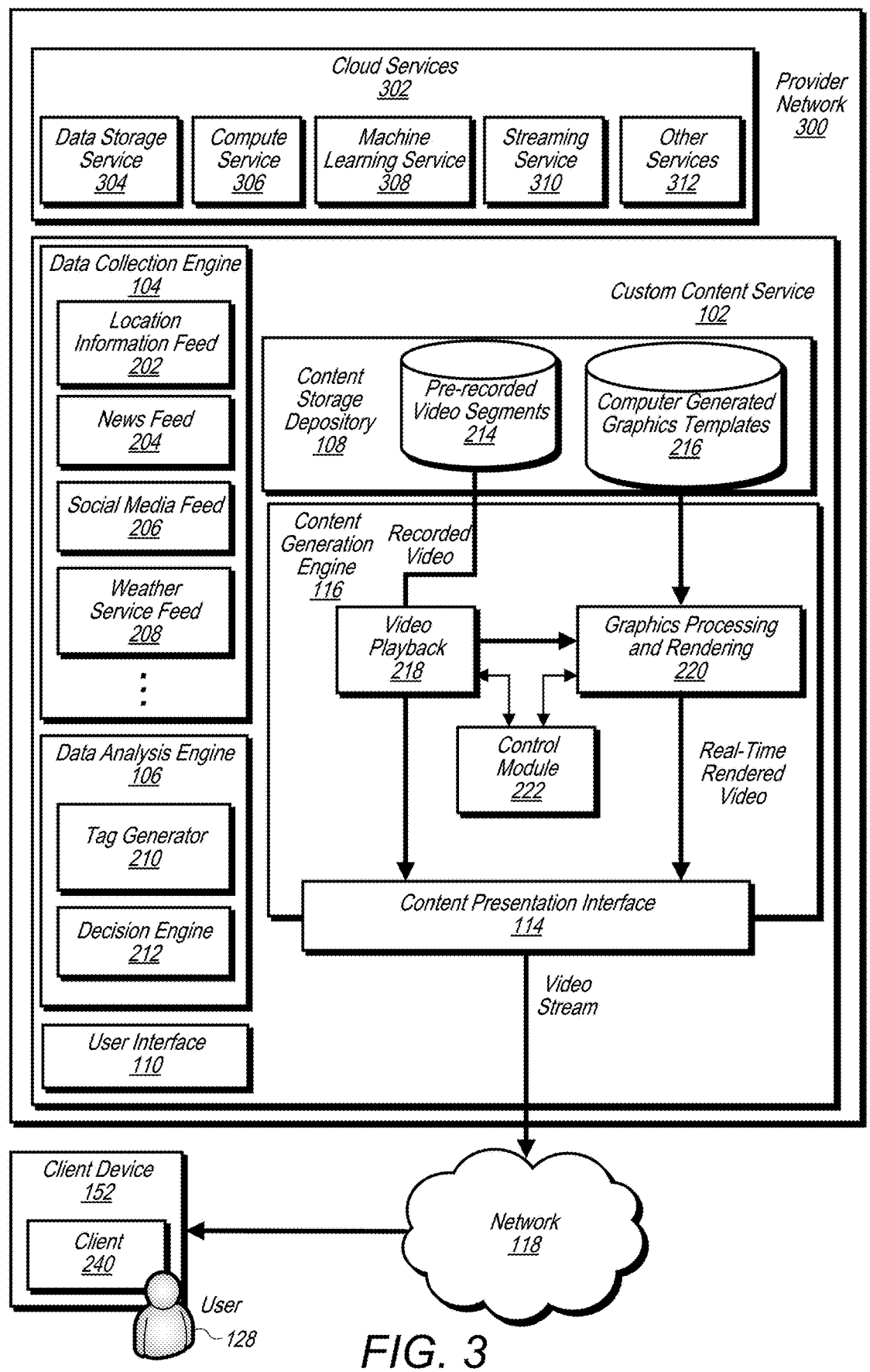
FIG. 3 is an illustration of a service provider network that includes a plurality of services including a custom content service, according to some embodiments.

FIG. 3 is an illustration of a service provider network that includes a plurality of services including a custom content service, according to some embodiments.

Embodiments of custom content services as described herein may be implemented in the context of a service provider that provides resources (e.g., computing resources, storage resources, database (DB) resources, etc.) on a provider network to clients of the service provider. FIG. 3 illustrates an example service provider network environment in which embodiments of a custom content service may be implemented.

FIG. 3 schematically illustrates an example of a provider network 300 that can provide computing and other resources to users via an intermediate network 118 and also implement components of a custom content service, such as custom content service 102, that provides custom content to clients via intermediate network 118. Provider network 300 may be configured to provide the resources for executing applications on a permanent or an as-needed basis. In at least some embodiments, resource instances may be provisioned via one or more cloud services 302, and may be rented or leased to clients of the service provider, for example to custom content service 102. At least some of the resource instances on the provider network 300 (e.g., computing resources) may be implemented according to a hardware virtualization technology that enables multiple operating systems to run concurrently on a host computer (e.g., a host), i.e. as virtual machines (VMs) on the host, such as VMs of compute service 306.

For example, in some embodiments, computing instances of compute service 306 may be used to implement data collection engine 104, data analysis engine 106, user interface 110, and content generation engine 116. In some embodiments, one or more storage instances of data storage service 304 may be used to implement content storage depository 108. In some embodiments, a machine learning service, such as machine learning service 308 of cloud services 302, may be used by a custom content service, such as custom content service 102, to learn additional event tags and/or to adjust content selection criteria. For example, FIG. 9B discusses interactions between a custom content service and a machine learning service.

In some embodiments, a custom content service, such as custom content service 102, may work in coordination with a streaming service, such as streaming service 310. For example, in some embodiments, provider network 300 may include a video streaming service, such as video streaming service 310. In some embodiments, the video streaming service may offer at least some of the streamed videos with a customization option. In such embodiments, a client may opt-in to having the at least some videos presented in a customized form. In such embodiments, the streaming service may instruct the custom content service to customize the at least some of the streamed videos based on the client's selection to receive the at least some videos in a customized format.

In some embodiments, cloud services 302 of provider network 300 may include other services 312, such as an internet of things (IoT) service, or other services. In some embodiments, a data collection engine of a custom content service, such as data collection engine 104 of custom content service 102, may further collect information from other services 312, such as from an IoT service. For example, sensors at a person's home such as weather sensors may provide information to a custom content service for use in making custom content selection decisions.

In some embodiments, the computing resources provided by provider network 300 may include various types of resources, such as gateway resources, load balancing resources, routing resources, networking resources, computing resources, volatile and non-volatile memory resources, content delivery resources, data processing resources, data storage resources, database resources, data communication resources, data streaming resources, and the like. For example, cloud services 302 includes data storage service 304, compute service 306, machine learning service 308, streaming service 310, and other services 312.

Each type of computing resource may be general-purpose or may be available in a number of specific configurations. For example, data processing resources may be available as virtual machine instances that may be configured to provide various services. In addition, combinations of resources may be made available via a network and may be configured as one or more services, such as to implement components of a custom content service that provides custom content for a streaming service. For example, computing instances of compute service 306 may be used to implement custom content service 102. Additionally, in some embodiments custom content service 102 may provide custom content as a coordinate component of a streaming service, such as streaming service 310.

In some embodiments, compute instances of cloud services 302 may be configured to execute applications, including services such as application services, media services, database services, processing services, gateway services, storage services, routing services, security services, encryption services, load balancing services, and so on. These services may be configurable with set or custom applications and may be configurable in size, execution, cost, latency, type, duration, accessibility, and in any other dimension. These services may be configured as available infrastructure for one or more clients and can include one or more applications configured as a platform or as software for one or more clients.

These services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources consisting of many processors, large amounts of memory and/or large storage capacity, and small resources consisting of fewer processors, smaller amounts of memory and/or smaller storage capacity.

Figure 11:
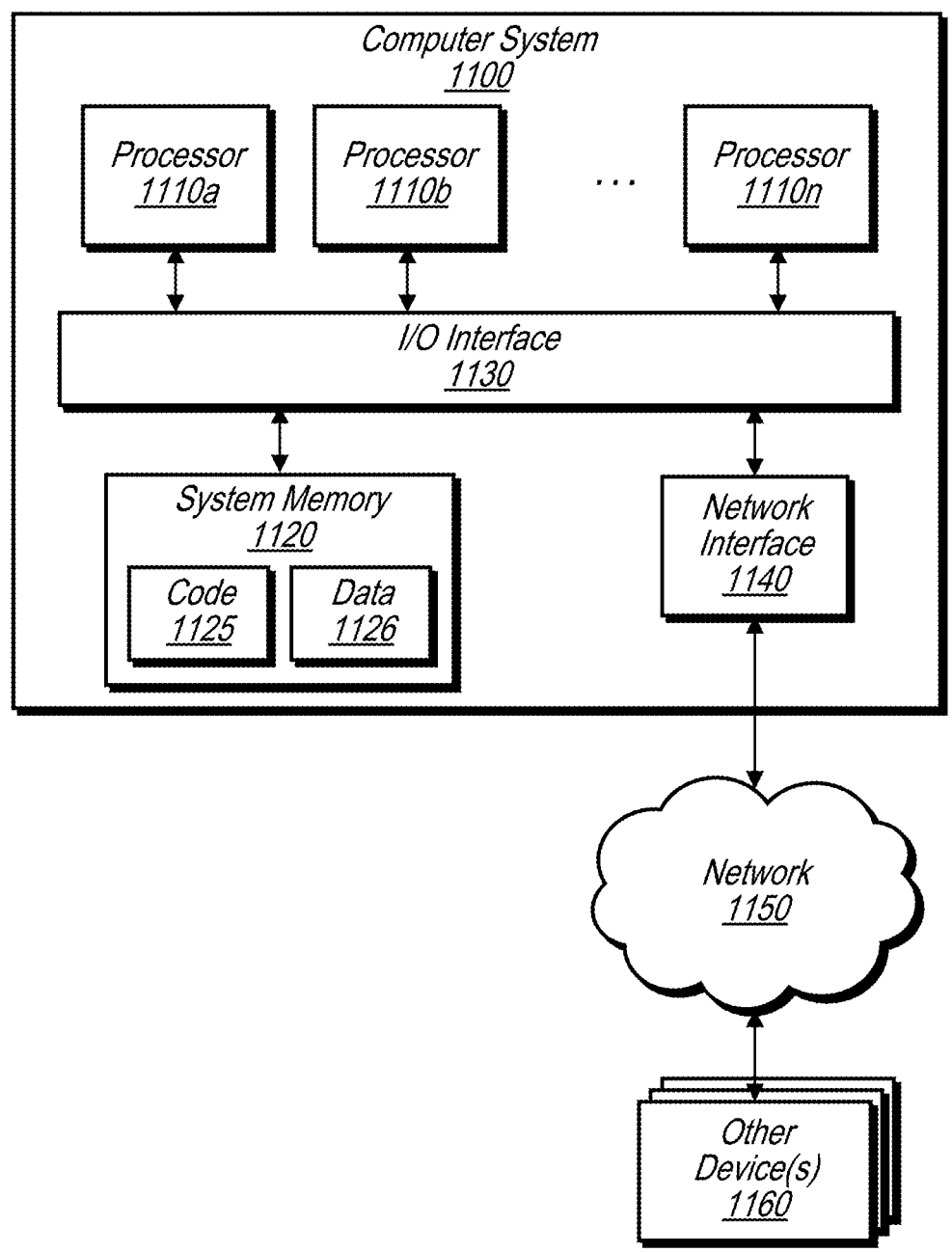
FIG. 11 is a block diagram illustrating an example computer system that may be used in some embodiments.

Provider network 300 may include a plurality of hosts that provide computing resources for cloud services 302. For example, FIG. 11 illustrates an example computer system that may be a host included in provider network 300. These resources may be available as bare metal resources or as virtual machine instances.

Referring to FIGS. 1-3, intermediate network 118 may, for example, be a publicly accessible network of linked networks and possibly operated by various distinct parties, such as the Internet. In other embodiments, intermediate network 118 may be a local and/or restricted network, such as a corporate or university network that is wholly or partially inaccessible to non-privileged users. In still other embodiments, intermediate network 118 may include one or more local networks with access to and/or from the Internet.

Intermediate network 118 may provide access to one or more client devices 152. Client devices 152 may be a television, a desktop or laptop personal computer, a tablet computer, a wireless telephone, a personal digital assistant (PDA), an e-book reader, a video game console, a set-top box or any other computing device capable of accessing provider network 118 via wired and/or wireless communications and protocols. In some instances, a client device 152 may connect directly to the Internet (e.g., via a cable modem or a Digital Subscriber Line (DSL)).

It should be appreciated that the network topologies illustrated in FIGS. 1-3 have been greatly simplified and that many more networks and networking devices may be utilized to interconnect the various computing systems disclosed herein. These network topologies and devices should be apparent to those skilled in the art.

It should also be appreciated that provider network 300 described in FIG. 3 is given by way of example and that other implementations might be utilized. Additionally, it should be appreciated that the functionality disclosed herein might be implemented in software, hardware or a combination of software and hardware. Other implementations should be apparent to those skilled in the art. It should also be appreciated that a host, server, gateway or other computing device may comprise any combination of hardware or software that can interact and perform the described types of functionality, including without limitation desktop or other computers, database servers, network storage devices and other network devices, PDAs, tablets, cell phones, wireless phones, pagers, electronic organizers, Internet appliances, television-based systems (e.g., using set top boxes and/or personal/digital video recorders), video game systems and video game controllers, and various other consumer products that include appropriate communication and processing capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Example Tag Generator

Figure 4:
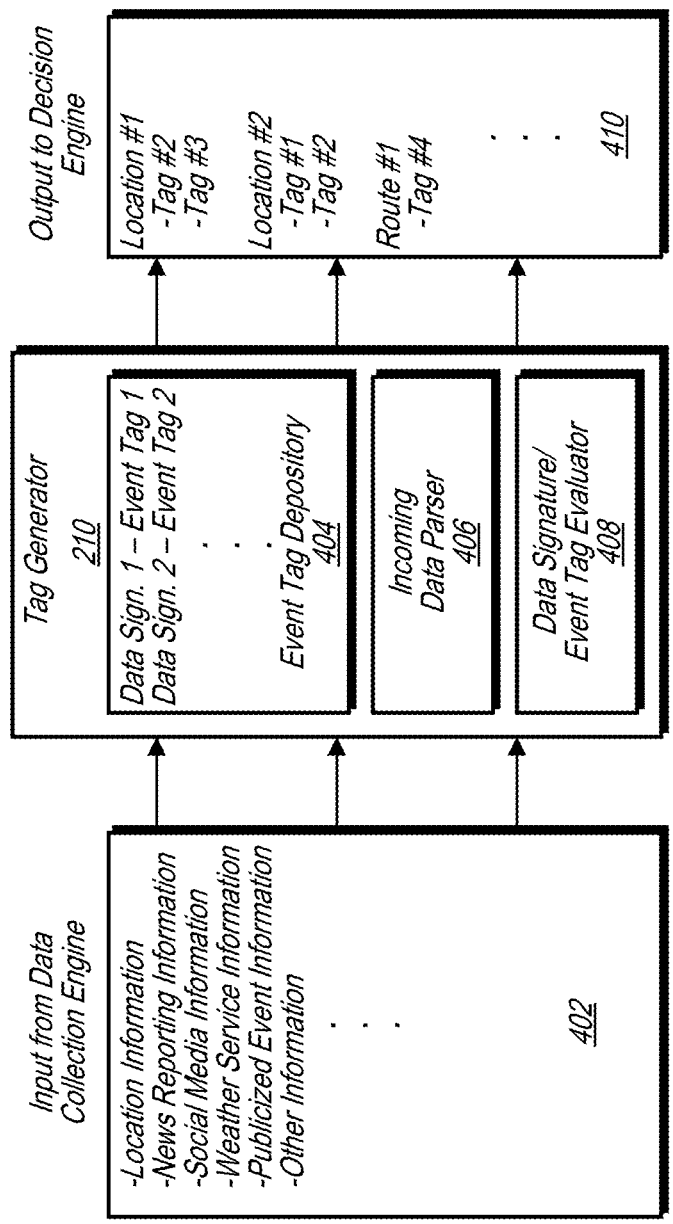
FIG. 4 is a more detailed illustration of a tag generator of a custom content service, according to some embodiments.

FIG. 4 is a more detailed illustration of a tag generator of a custom content service, according to some embodiments.

In some embodiments, a tag generator, such as tag generator 210, may receive inputs from a data collection engine, such as data collection engine 104. In some embodiments, the inputs, such as inputs 402, may include location information, news reporting information, social media information, weather service information, publicized event information, and/or other information.

In some embodiments, a tag generator, such as tag generator 210, may include an incoming data parser 406, an event tag depository 404, and a data signature/event tag evaluator 408. In some embodiments, an event tag depository 404 may store pairs of data signatures and corresponding event tags or key words. In some embodiments, an incoming data parser, such as incoming data parser 406, may break up incoming data into data signatures and a data signature/event tag evaluator, such as data signature/event tag evaluator 408, may compare the parsed data signatures to known data signatures stored in the event tag depository 404. Furthermore, the data signature/event tag evaluator 408 may assign event tags or key words to locations for which an associated data signature matched one or more of the known data signatures stored in the event tag depository 404. For example, tag generator 210 may provide output 410 comprising a list of locations and associated event tags or key words, wherein the locations are locations the client has visited or locations along a route the client has traveled.

In some embodiments, incoming data parser 406 may parse text to identify data signatures. In some embodiments, incoming data parser 406 may parse images, audio, or videos to identify data signatures, wherein the event tag depository 404 stores image data signatures and associated tags, audio data signatures and associated tags, and/or video data signatures and associated tags.

In some embodiments, a tag generator may consider a relative closeness between a location associated with input data from the data collection engine, such as a social media event, and locations the client has visited. For example, a client may have traveled in a general vicinity of a basketball arena at which an NBA play-off game is taking place, and social media information may include data signatures related to the NBA play-off game at locations in the vicinity of a route the client traveled, but not necessarily on the route. In such situations, the tag generator may take into account the relative closeness between the route the client traveled and a location of an event when determining whether to include the event's associated event tag in output 410.

Example Decision Engines

FIG. 5 is a more detailed illustration of a decision engine of a custom content service that utilizes a decision tree process, according to some embodiments.

In some embodiments, a decision engine, such as decision engine 212, may receive output 410, for example from a tag generator 210, wherein the output 410 is an input to the decision engine. The output from the tag generator may include locations and/or routes and event tags or key words associated with the locations or routes, wherein the locations or routes are locations the client has recently visited or routes the client has recently taken. In some embodiments, an age for inclusion of routes or locations may be an adjustable parameter. For example, in some embodiments only locations or routes for a most recent trip may be considered. In other embodiments, cumulative locations or routes over a day, week, month, etc. may be considered.

In some embodiments, a decision engine may utilize a decision tree to make one or more content selection decisions. For example, FIG. 5 illustrates an example embodiment of a decision engine 212 that utilizes a decision tree. Though, in some embodiments other decision making frameworks may be used by a decision engine, such as decision engine 212. For example, FIG. 6 illustrates an alternative embodiment of a decision engine that utilizes a point scoring procedure to make one or more content selection decisions.

In some embodiments, wherein a decision engine utilizes a decision tree, a series of decision points and branches may be used to lead to respective content selection decisions. For example, decision engine 212 shown in FIG. 5 includes decision points 502, 504, 506, 508, and 510, which lead to content selection decisions 512, 514, 516, 518, and 520. In some embodiments a decision tree included in a decision engine, such as decision engine 212 shown in FIG. 5, may include any number of decision points, branches, and content selection options.

In some embodiments, a decision engine, such as decision engine 212, may output one or more content selection decisions 522. The content selection decisions may be provided to a content generation engine, such as content generation engine 116 for use in generating customized content.

FIG. 6 is a more detailed illustration of a decision engine of a custom content service that utilizes a scoring process, according to some embodiments.

In some embodiments, a decision engine, such as the decision engine 212 shown in FIG. 6 may utilize a point scoring procedure to make one or more content selection decisions. For example, table 602 for "ending A' includes tag categories 608 and tags included in input 410 corresponding to each of the tag categories. Table 602 also includes locations 610, tag weights 612, and location weights 614. In some embodiments, a table such as table 602, 604, or 606 may be populated for each content selection option. In some embodiments, a total score for each content selection option may be determined based on the tags, locations, and weights from the input 410 that populate the table, such as table 602. For example a total score 616 is determined for "ending A" represented by table 602 and a total score 618 is determined for "ending B" represented by table 604.

In some embodiments, a decision engine, such as decision engine 212 shown in FIG. 6, which utilizes a point scoring decision procedure, may output a highest scoring content selection option as the selected content option. Also, in some embodiments, a decision engine, such as decision engine 212 shown in FIG. 6, which utilizes a point scoring decision procedure, may output multiple content options as selected content options, each having a determined score greater than a threshold score. For example, decision engine 212 shown in FIG. 6, outputs content selection decision 620.

Example User Interface

FIG. 7 illustrates an example user interface for opting into a custom content service, according to some embodiments.

In some embodiments, a user interface of a custom content service, such as user interface 110, may implement various interfaces to accept authorization from a client to opt-in to a custom content service. In some embodiments, such a user interface may implement a webpage, such as page 700. In some embodiments, a user interface to a custom content service, such as that implements page 700, may allow a client to select a mobile device to authorize to share location information with the custom content service. For example, page 700 includes mobile device entry 702, wherein a client has entered "cell phone GPS" into box 704 of mobile device entry 702. In some embodiments, a user interface to a custom content service, such as that implements page 700, may further allow a client to select when and where the selected mobile device is authorized to share location information with the custom content service. For example, page 700 includes authorized location areas entry 706 and authorized sharing times entry 710. Note client has entered "between office and home" in box 708 of authorized location areas entry 706 and has entered "between 5:00 and 7:00 p.m." in box 712 of authorized sharing times entry 710.

In some embodiments, a user interface, such as that implements page 700, may further include a submit button, such as submit button 714. In some embodiments, in response to the submit button being selected, the custom content service may begin to collect location information as specified by the client for use in making custom content selection decisions to provide customized content to the client.

In some instances, a user may not wish to authorize the collection of data via the user's mobile device. In such instances, the user can provide, via a user interface such as page 700, various location information, such as the route the user took to work, the user's work location, home location, or any other location information the user wishes to share. For example, in some embodiments, the user may select "none" in box 704 of mobile device entry 702. Additionally, the user may enter a general route the user takes, such as between the user's office and home, in box 708. Additionally, the user may enter general times the user takes the route, such as in box 712. For example, the user may indicate that the user typically drives home from work between 5:00 p.m. and 7:00 p.m. on Interstate 105. This information can be utilized in a similar manner to the location information collected automatically via the user's mobile device to provide customized content for the user. For example, the custom content service may be made aware of events taking place at or near Interstate 105 between 5:00 and 7:00 p.m. and may customize the user's content accordingly.

Figure 8:
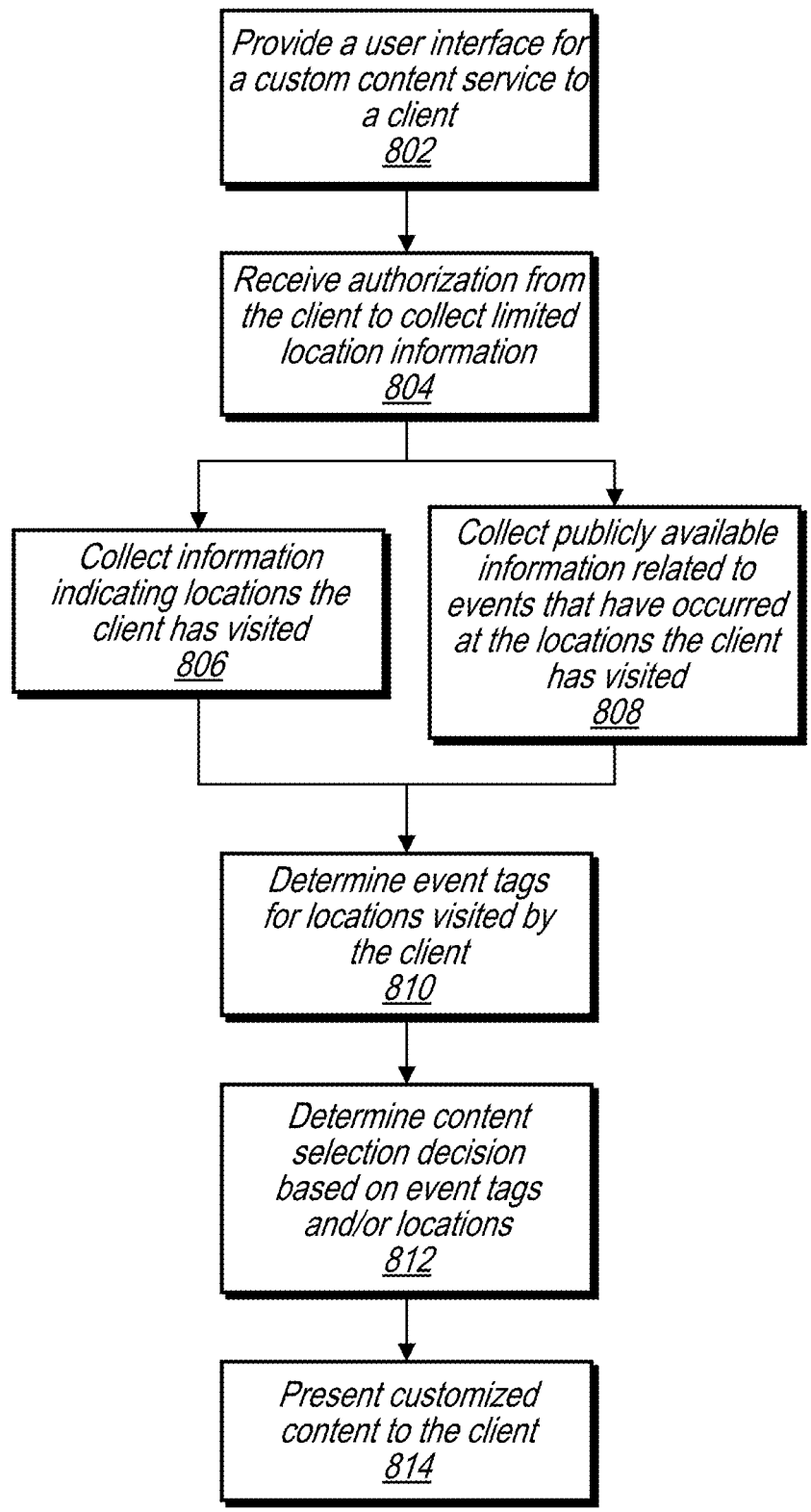
FIG. 8 is a high-level flow chart illustrating a custom content service providing custom content, according to some embodiments.

FIG. 8 is a high-level flow chart illustrating a custom content service providing custom content, according to some embodiments.

At 802, one or more computers implementing a custom content service provide a user interface to a client for opting-in to receive custom content from the custom content service and opting-in to allowing the custom content service to receive limited location information about the client for use in providing the custom content. In some embodiments, the user interface may include one or more APIs to the custom content service, a graphical user interface, such as webpage, for example as illustrated in FIG. 7, a command line interface, or other type of user interface.

At 804, the one or more computers implementing the custom content service receive authorization from the client for the custom content service to collected limited amounts of location data about places the client has visited and/or routes the client has taken, wherein the location information is used to make content selection decisions for custom content to be provided to the client, according to some embodiments.

At 806, information indicating locations visited by the client of the custom content service is collected. For example, the client may download an application to a mobile device of the client and may further authorize the application to share limited location information from a GPS or other location module of the mobile device with the custom content service via a network connection between the mobile device and the custom content service.

At 808, the custom content service collects publicly available information about locations the client has visited or routes the client has taken. In some embodiments, the publicly available information may include one or more news fees, a weather service feed, feeds from social media, publicized events and locations, etc.

At 810, one or more computers implementing the custom content service determine tags or key words associated with locations the client has visited or routes the client has taken, based on the location information collected at 806 and the publicly available information collected at 808. In some embodiments, a tag generator, such as tag generator 210, may be used to determine tags or key words associated with locations the client has visited or routes the client has taken.

At 812, one or more computers implementing the custom content service determine content selection decisions to select customized content to be provided to the client of the custom content service. The content selections decisions may be made based on the tags or key words determined at 810 and one or more decision frameworks used by the custom content service, such as a decision tree framework as described in FIG. 5, a point scoring framework as described in FIG. 6, or a suitable alternative decision framework.

At 814, customized content that includes content segments in accordance with the one or more content selection decisions made at 812 is presented to the client. For example, in some embodiments, a content generation engine may generate customized content in accordance with content selection decisions made at 812 and a content presentation interface may provide the generated customized content as streaming content to a client device of the client.

Figure 9A:
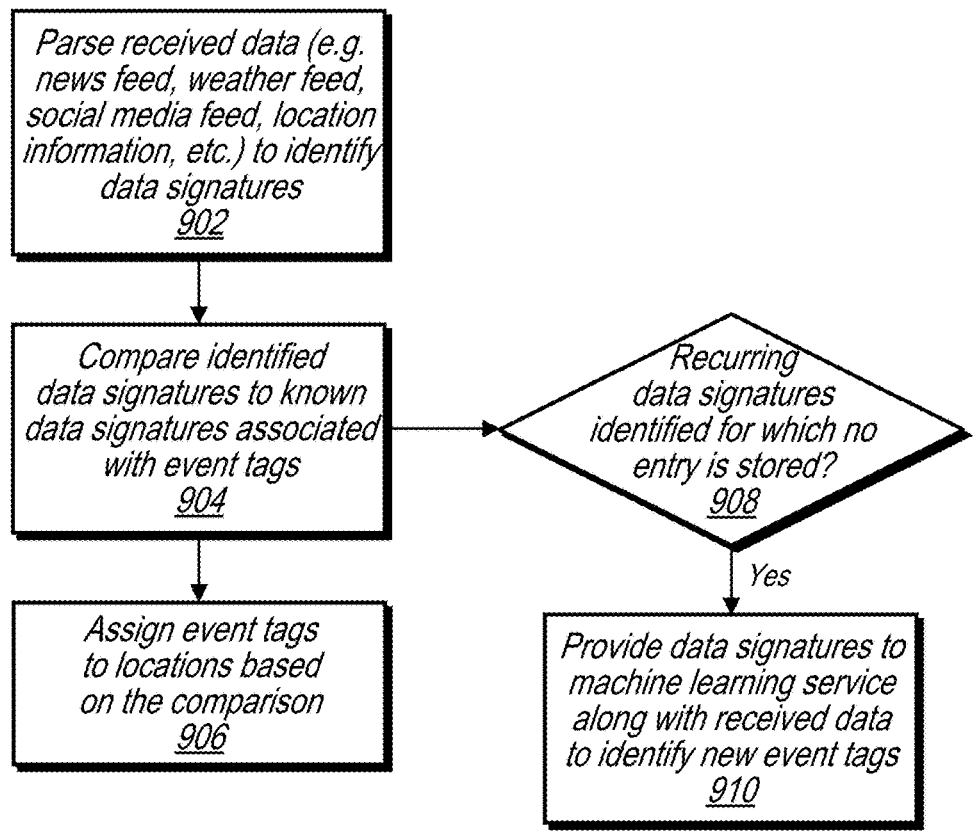
FIG. 9A is a high-level flow chart illustrating a custom content service identifying event tags in received information, according to some embodiments.

FIG. 9A is a high-level flow chart illustrating a custom content service identifying event tags in received information, according to some embodiments.

At 902, a custom content service parses received data, such as information from a news feed, weather feed, social media feed, location information from a client mobile device etc. As part of parsing the received data, the custom content service identifies data signatures in the received data.

At 904, the custom content service compares data signatures in the received data with known data signatures that correspond with tags or key words. For example, a custom content service may store pairs of data signatures and corresponding event tags or key words.

At 906, the custom content service assigns tags, such as event tags or key words, to locations or routes with associated data signatures that match or match within a threshold amount, data signature-tag pairs stored by the custom content service.

At 908, the custom content service determines whether or not the received data or previous sets of received data include recurring data signatures for which no data signature-event pairs are stored by the custom content service. If so, at 910, the recurring data signatures are provided to a machine learning service for use in generating new data-signature-tag pairs.

Figure 9B:
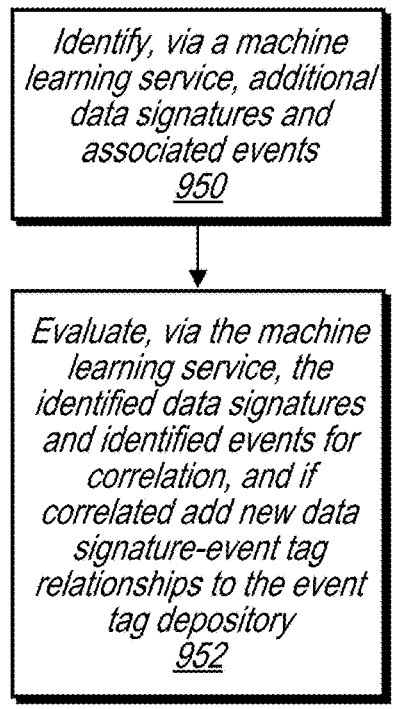
FIG. 9B is a high-level flow chart illustrating a custom content service utilizing a machine learning service to learn new event tag definitions, according to some embodiments.

FIG. 9B is a high-level flow chart illustrating a custom content service utilizing a machine learning service to learn new event tag definitions, according to some embodiments.

In some embodiments, a machine learning service, may receive data comprising recurring data signatures, for example as a result of 910. Additionally, at 950, the machine learning service may determine tags, such as event tags or key words, to be associated with the recurring data signatures.

Figure 10:
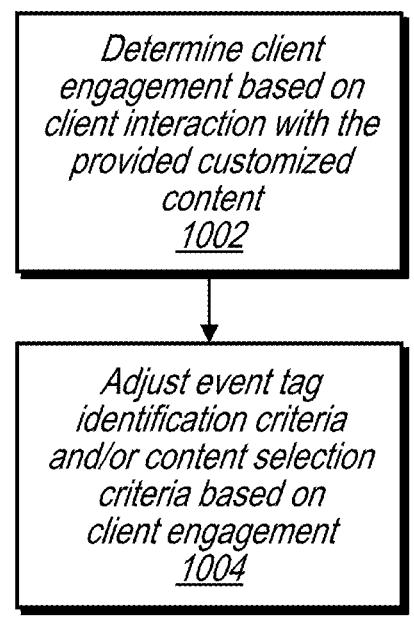
FIG. 10 is a high-level flow chart illustrating a custom content service adjusting customization criteria based on client engagement, according to some embodiments.

In some embodiments, at 952, the machine learning service may further evaluate the identified data signatures and identified events for correlation and if correlated add correlated data signature-tag pairs to the custom content service to be included in an event tag depository of the custom content service, for example FIG. 10 is a high-level flow chart illustrating a custom content service adjusting customization criteria based on client engagement, according to some embodiments.

At 1002, a custom content service determines client engagement based on client interaction with customized content provided to the client. For example, did the client watch a full episode of a customized content show, or did the client request additional episodes of the customized content show.

At 1004, the custom content service adjusts event tag identification criteria and/or content selection criteria based on the determined client engagement. For example, the custom content service may provide client engagement data back to a machine learning service for use in better selecting data signature-tag pairs, or the custom content service may further utilize the machine learning service to optimize content selection criteria based on client engagement data.

Illustrative Computing System

In at least some embodiments, a computing device that implements a portion or all of the technologies as described herein may include a general-purpose computer system that includes or is configured to access one or more computer-readable media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-readable medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-readable medium may include transmission media or signals such as electrical, electromagnetic, or digital signals, conveyed via a communication medium such as a network and/or a wireless link, such as may be implemented via network interface 1140.

CONCLUSION

Various embodiments may further include receiving, sending or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system for implementing a custom content service, the system comprising:
   one or more computing devices storing program instructions, that when executed by one or more processors, implement a data collection engine configured to:
      receive authorization from a client of the custom content service indicating that that the client has selected to participate in data collection for use in providing custom content to the client, wherein the authorization indicates when or where the data collection is authorized to be performed; and
      in response to receiving the authorization:
         collect information related to locations the client has visited from a mobile device of the client; and
         collect information from one or more additional information sources, wherein the information collected from the one or more additional information sources comprises location information;
   one or more computing devices storing program instructions, that when executed by one or more processors, implement a data analysis engine configured to:
      determine a set of one or more event tags associated with one or more of the locations the client has visited, wherein to determine the one or more event tags, the data analysis engine is configured to compare:
         location information included in the collected information from the one or more additional information sources to the locations the client has visited indicated in the information collected from the mobile device of the client; and
         data in the collected information from the mobile device or the one or more additional data sources associated with the one or more locations the client has visited to a set of known data signatures, correlated with event tags, to determine the set of event tags associated with the one or more locations the client has visited; and
      determine one or more content selection decisions based on one or more event tags of the set of event tags determined for a set of locations the client has visited during a time period prior to making the one or more content selection decisions; and
   one or more computing devices storing program instructions, that when executed by one or more processors, implement a content presentation interface configured to:
      provide customized content to the client comprising content selected based, at least in part, on the determined one or more content selection decisions, wherein the system is configured to customize the content presented to the client based on the locations the client has visited and events associated with the locations the client has visited, without directly asking the client to provide input to make the one or more content selection decisions.

2. The system of claim 1, further comprising a provider network of a service provider that provides resources comprising a virtual computing service, a data storage service, and a video streaming service to clients of the service provider, wherein:
   the one or more computing devices that are configured to implement the data collection engine and the one or more computing devices that are configured to implement the data analysis engine are computers of the virtual computing service of the provider network,
   the service provider data storage service is configured to store the information collected from the mobile device of the client and the information collected from the one or more additional information sources; and
   the one or more computing devices that are configured to implement the content presentation interface are computers of the video streaming service of the provider network.

3. The system of claim 1, wherein the customized content comprises:
   one or more pre-recorded content segments selected based on the one or more content selection decisions from a plurality of pre-recorded content segments; or
   one or more computer generated content segments generated based on the one or more content selection decisions.

4. The system of claim 1, wherein the one or more additional information sources comprise one or more of:
   news coverage related to the locations the client has visited;
   social media posts related to the locations the client has visited;
   weather information related to the locations the client has visited; or
   publicized events at or near the locations the client has visited.

5. A method, comprising:
   receiving an authorization from a client to participate in data collection for use in providing customized content, wherein the authorization indicates when or where the data collection is authorized to be performed;

collecting information related to locations a client of a custom content service has visited from a mobile device of the client or from the one or more additional information sources;

determining a set of one or more tags associated with one or more of the locations the client has visited, wherein determining the set of one or more tags comprises comparing data in the collected information associated with the one or more locations the client has visited to a set of known data signatures, correlated with tags, to determine the set of one or more tags associated with the one or more locations the client has visited;

determining one or more content selection decisions based on one or more event tags of the set of tags determined for a set of locations the client has visited during a time period prior to making the one or more content selection determinations; and presenting customized content to the client comprising content selected based, at least in part, on the determined one or more content selection decisions.

6. The method of claim 5, further comprising:

providing an interface to the custom content service to the client; and receiving from the client, via the interface, authorization to participate in data collection for use in providing custom content to the client;

wherein said collecting information related to locations the client has visited is performed in response to receiving the authorization.

7. The method of claim 5, wherein presenting the customized content to the client comprises:

presenting one or more pre-recorded content segments selected based on the one or more content selection decisions from a plurality of pre-recorded content segments.

8. The method of claim 5, wherein presenting the customized content to the client comprises:

generating one or more computer generated content segments based on the one or more content selection decisions.

9. The method of claim 5, wherein presenting the customized content to the client comprises:

generating one or more computer generated images for inclusion in one or more pre-recorded content segments selected from a plurality of pre-recorded content segments; and presenting the one or more pre-recorded content segments with the one or more computer generated images included in the pre-recorded content segments.

10. The method of claim 5, wherein said determining the one or more content selection decisions comprises:

applying the determined tags to a decision tree, wherein the decision tree comprises branches that lead to different ones of a plurality of customized content options, and wherein the presence or absence of tags matching respective criteria is used to evaluate which of the respective branches of the decision tree is to be followed to determine the one or more content selection decisions.

11. The method of claim 5, wherein said determining the one or more content selection decisions comprises:

assigning a score value to a first customized content option based on tags matching one or more criteria associated with the first customized content option;

assigning one or more additional respective score values to one or more additional respective customized content options, based on tags matching one or more respective criteria associated with each of the one or more additional respective customized content options, wherein:

one or more of the customized content options with assigned score values greater than respective inclusion thresholds for the one or more customized content options are selected for inclusion in the customized content to be presented to the client; or one of the customized content options with a greater assigned score value than other ones of the customized content options is selected for inclusion in the customized content to be presented to the client.

12. The method of claim 5, wherein determining the one or more tags comprises:

assigning tags to locations with associated data that matches respective ones of the data signatures by at least a threshold amount.

13. The method of claim 5, further comprising:

determining client engagement data based on client interactions with the customized content presented to the client; and adjusting one or more criteria used to determine the tags or one or more criteria used to determine the one or more content selection decisions based, at least in part, on the determined client engagement data.

14. One or more non-transitory, computer-readable storage media storing instructions that, when executed on or across one or more processors, cause the one or more processors to:

receive an authorization from a client of a custom content service to participate in data collection for use in providing customized content to the client, wherein the authorization indicates when or where the data collection is authorized to be performed;

collect information from a mobile device of the client or from one or more additional information sources, wherein the information is related to locations the client has visited;

determine, based on the collected information, a set of one or more tags associated with one or more of the locations the client has visited, wherein said determine comprises compare data in the collected information associated with the one or more locations the client has visited to a set of data signatures, correlated with tags, to determine the set one or more tags;

determine one or more content selection decisions based on one or more tags of the set of tags determined for a set of locations the client has visited during a time period prior to making the one or more content selection determinations; and cause customized content to be presented to the client, wherein the customized content comprises content selected based, at least in part, on the determined one or more content selection decisions.

15. The one or more non-transitory, computer-readable storage media of claim 14, wherein the customized content presented to the client comprises one or more pre-recorded content segments selected based on the one or more content selection decisions from a plurality of pre-recorded content segments.

16. The one or more non-transitory, computer-readable storage media of claim 14, wherein the customized content presented to the client comprises one or more computer generated content segments, generated based on the one or more content selection decisions.

17. The one or more non-transitory, computer-readable storage media of claim 14, wherein the collected information comprises information from the mobile device of the client and the information from the one or more additional information sources, wherein the one or more additional information sources comprises one or more of:
- a social media information source;
- a news reporting information source; or
- a weather service information source.

18. The one or more non-transitory, computer-readable storage media of claim 14, wherein to perform said determine one or more tags, the program instructions, when executed on or across the one or more processors, cause the one or more processors to:
- assign tags to locations with associated data that matches respective ones of the data signatures by at least a threshold amount.

19. The one or more non-transitory, computer-readable storage media of claim 18, wherein, the program instructions, when executed on or across the one or more processors, cause the one or more processors to:
- identify, via a machine learning algorithm, additional data signatures and associated tags; and
- evaluate, via the machine learning algorithm, the additional data signatures and associated tags for inclusion in the set of data signatures associated with the plurality of tags that are compared against the collected information.

20. The one or more non-transitory, computer-readable storage media of claim 14, wherein to perform said determine one or more content selection decisions, the program instructions, when executed on or across the one or more processors, cause the one or more processors to:
- apply the determined tags to a decision tree to select one or more customized content options; or
- assign score values to a plurality of customized content options to select one or more customized content options.

* * * * *